United States Patent [19]

Manhart

[11] Patent Number: 5,113,064
[45] Date of Patent: May 12, 1992

[54] METHOD AND APPARATUS FOR PHASING SEGMENTED MIRROR ARRAYS

[75] Inventor: Paul K. Manhart, North Hollywood, Calif.

[73] Assignee: The United States of America as represented by the Administrator of the National Aeronautics and Space Administration, Washington, D.C.

[21] Appl. No.: 665,509

[22] Filed: Mar. 6, 1991

[51] Int. Cl.⁵ .............................................. G01J 1/20
[52] U.S. Cl. .................................. 250/201.9; 359/849
[58] Field of Search ...................... 250/201.9; 350/611

[56] References Cited

U.S. PATENT DOCUMENTS

| | | | |
|---|---|---|---|
| 3,980,879 | 9/1976 | O'Meara | 250/201.9 |
| 4,016,415 | 4/1977 | O'Meara | 250/201 |
| 4,141,652 | 2/1979 | Feinleib | 356/121 |
| 4,309,602 | 1/1982 | Gonsalves et al. | 250/201 |
| 4,393,303 | 7/1983 | Spinhirne | 250/201 |
| 4,399,356 | 8/1983 | Feinleib et al. | 250/201 |
| 4,405,232 | 9/1983 | Mansell | 356/121 |
| 4,518,854 | 5/1985 | Hutchin | 250/201 |
| 4,620,790 | 11/1986 | Hufnagel | 356/124 |
| 4,737,621 | 4/1988 | Gonsiorowski et al. | 250/201 |
| 4,816,759 | 3/1989 | Ames et al. | 324/207 |
| 4,825,062 | 4/1989 | Rather et al. | 250/201 |

OTHER PUBLICATIONS

G. Chanan, T. Mast, J. Nelson, Keck Observatory Report #171, "Keck Telescope Primary Mirror Segments: Initial Alignment and Active Control", (published in Proceedings of the ESO Conf. on Very Large Telescopes and their Instrumentation, Garching, Mar. 21-24, 1988).
J. Nelson, T. Mast, G. Chanan, "Aberration Correction in a Telescope with a Segmented Primary", SPIE Active Telescope Sytems, vol. 1114, 1989, pp. 241-257.
P. Manhart, "Segmented Mirror, Manufacturing and Alignment Tolerances (SMMAT)", SPIE Active Telescope Systems, vol. 1114, 1989, pp. 387-405.

*Primary Examiner*—Carolyn E. Fields
*Attorney, Agent, or Firm*—Thomas H. Jones; John R. Manning

[57] ABSTRACT

A method and apparatus are disclosed for edge phasing an array of segments in a segmented primary telescope mirror using white light from a far field source and starting with the inner edge of each segment in the first ring of segments. The segments are individually phased for zero piston and tilt error with respect to the edge of a reference surface in the open center position of the telescope mirror, and proceeding from ring to ring by edge phasing one edge of each segment in each subsequent ring with an edge of a segment in a preceding ring that has been edge phased. After edge phasing of all segments in the telesope mirror array has been completed, full surface phasing can be achieved using a conventional Shack-Hartmann technique followed by finding the RMS best fit for each segment of the mirror array.

6 Claims, 4 Drawing Sheets

METHOD AND APPARATUS FOR PHASING SEGMENTED MIRROR ARRAYS

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to a method and apparatus for phasing an array of reflector segments in a segmented mirror array, and more particularly to an edge phasing technique for phasing the inside edges of a first ring of segments with respect to a high-quality reference surface, and then bringing all adjacent segment edges into phase throughout the array using the edge phasing technique, following which full surface phasing can be achieved using a conventional Shack-Hartmann technique.

BACKGROUND ART

A figure-initialization scheme for segmented mirror telescopes is necessary for establishing the best possible performance for a given set of mirror segments. Both manufacturing errors and alignment errors of the segments contribute to reduced performance. Ideally, one would like to achieve the smoothest possible surface over the entire array to minimize RMS wavefront error. There are many different ways of establishing this condition that have been used on high quality optical arrays throughout the industry. Some of these methods are image plane techniques in which diffraction airy disks are measured in terms of Strehl ratio, encircled energy, knife edge test, etc. Other methods use interferometry where optical path errors are measured over the surface. However, large slope errors and surface discontinuities limit the usefulness of these types of tests because of blur size, fringe density and $2\pi$ ambiguities. Phasing an array with large surface errors (about $3\mu$ RMS surface error) is difficult using conventional optical techniques because such surface errors are large compared to optical wavelengths.

Typically, monolithic surfaces with large optical errors are quantified using ray-based slope measurement techniques instead of interferometry because of the extended dynamic range and ease of interpretation of the results over interferometry. These techniques, such as the well known Shack-Hartmann technique, have been used extensively throughout the industry and are familiar to those skilled in the art.

The Shack-Hartmann technique is based on a purely geometrical optics approach using a layout schematically illustrated in FIG. 1a with a lenslet array shown in FIG. 1b in the path of the planar image of the segmented mirror under test. The lenslets indicated by small circles in FIG. 1b represent subapertures on the individual segment surfaces indicated by hexagonal boundary lines for the segments. The denser the lenslet array, the higher the sampling frequency on the segmented mirror surface. A white-light source and beam splitter (BS) shown are used only for internal calibration of the Shack-Hartmann camera. While phase adjusting segments of the primary mirror, a star off to the right of the diagram in FIG. 1a functions as the necessary white-light source. The collimated light is reflected by the primary mirror through the field lens of the camera and from there through a collimating lens to a detector plane.

The lenslets focus the light from each subaperture at a different location on the detector plane of the camera, which may be a charge-coupled device (CCD) in a television camera. Measuring the spot centroid location from nominal yields the average slope over that particular part of the segment surface. The premise is that a portion of a wavefront, when tilted relative to the ideal wavefront in that region, causes light to come to a focus at a place other than was originally intended.

By minimizing the RMS deviation of centroid location with respect to the nominal reference spots, it is possible to use the conventional Shack-Hartmann technique to remove tilt from each segment surface. However, this technique is insensitive to height displacement between edges of segments. Two segments could have identical average slopes but be displaced and therefore out of phase at the edges by an unacceptable amount. Thus, slope measurements being independent of surface height are unsuitable for phasing segmented arrays because relative height errors between segments (hereinafter referred to as "piston errors") are not taken into account. The present invention addresses this problem.

In a recent Keck Observatory Report #180, titled "Aberration Correction in a Telescope with a Segmented Primary" by Nelson, Mast and Chanan (published in SPIE, Vol. 1114, Active Telescope Systems, Mar. 1989), a method is described for measuring the local relative piston error of two adjacent segments using a modified Shack-Hartmann camera layout described in Keck Observatory Report #171 titled "Keck Telescope Primary Mirror Segments: Initial Alignment and Active Control," by Chanan, Mast and Nelson, (published in Proceedings of the ESO Conference on Very Large Telescopes and their Instrumentation, Garching, Mar. 21-24, 1988). This modification uses a conventional Shack-Hartmann camera layout as shown schematically in FIG. 1a, but instead of the mirror surface under test being relayed to a lenslet array in collimated space with the lenslets arrayed as shown in FIG. 1b, the mirror surface is relayed to a lenslet array with only one lenslet in the center and a lenslet straddling the edges of adjacent segments shown in FIG. 1c. Each lenslet represents a subaperture for the segmented mirror covering a small portion of the surface under test.

By straddling a lenslet across each boundary between adjacent segments, the local relative piston and tilt error at each boundary is detected by the character of the diffraction image of a far field white light source reflected by two adjacent mirror segments. This method of edge testing piston and tilt error is based purely on a physical optics approach. The two wavefronts reflected by adjacent mirror segments going through the same lenslet act as an interferometer giving a characteristic signature (i.e., a white-light contour map of point-spread function) shown in FIG. 3a when fully in phase (i.e., when free of piston and tilt error). Signatures obtained when the two segments are out of phase by one quarter and one half wavelength are shown in FIGS. 3b and 3c. Any tilt error about an x or y axis produces another signature as shown in FIGS. 3d and 3e for a tilt of 0.1 and 0.2 (Airy disk), respectively. Other signatures for other extents of piston and/or tilt error experienced during this edge phasing technique will, of course, occur. The lenslet signature at the detector is thus indicative of piston (z axis) error and tilt (x or y axis) error at the edges of one segment relative to an adjacent segment. Correction of piston and tilt error is made by adjustment in the x, y and z axis of the segment being tested until the in-phase signature of FIG. 3a is achieved. The symmetry of that signature indicates that there is no piston or tilt of one segment with respect to another segment at their adjacent edges.

Conversely, the conventional Shack-Hartmann test, which measures slopes, would not be able to pick up that piston error. It has been discovered that in accordance with the present invention both these tests involving physical and geometrical optics, it is possible for a segmented array to be phased over the full aperture with high sample density by incorporating these techniques involving physical and geometrical optics and finding for each panel the RMS best fit to a pre-established reference surface. This new technique is useful for even large surface errors since it would be necessary to simply adjust one segment relative to the adjacent edge of a segment already phase adjusted for piston and tilt error until the white-light contour map of point spread function yields the signature characteristic of in-phase (zero piston and tilt error) reflection by the adjacent edges of two segments.

In a paper published in SPIE, Vol. 1114, Active Telescope Systems, (1989) by P.K. Manhart and J.M. Rodgers titled "Segmented Mirror Manufacturing and Alignment Tolerances," a computer program is described that has the ability to model the performance of segmented mirror telescopes with individual manufacturing and alignment errors on each segment. This program also has the ability to evaluate the optical performance of the given array before and after the array has been properly phased. The program may therefore be used to achieve full phase alignment of the segments of an array (as opposed to edge alignment) by finding the RMS best fit for each segment in terms of surface height variations with respect to some hypothetical geometric reference in space, e.g., a parabolic surface.

A hypothetical surface obtained by rotating a curve $f(x,y)=0$, $z=0$, such as a parabola, is a convenient reference for the segments because all that is required is to define the curve to be located at the origin and treat it mathematically, as though a reference surface to which the segments can be fit does exist in reality. However, to achieve this best fit condition, the absolute distance from the reference point (e.g., focus) to both the reference surface and each segment is needed because the array is a discontinuous surface with unknown piston errors between segments. Thus, the above-mentioned technique of optimization may be used to achieve full phase alignment only if a reference surface can be defined, and if surface height continuity (i.e., zero piston error) can be achieved from one segment to the next.

STATEMENT OF THE INVENTION

An objective of this invention is to provide a method and apparatus for using optical techniques to phase the edges of a first ring of segments with respect to a reference surface in a central position of a telescopic mirror comprised of an array of reflector segments, such as a paraboloidal reflector reference surface at the origin of a parabolic segmented mirror. Once edge phasing of the first ring of reflector segments in the telescope mirror is achieved, edge phasing all other segments in subsequent rings of reflector segments is carried out at one adjacent edge of each reflector segment with an edge of a segment in an inner ring of segments. Full surface phasing may thereafter be achieved using a conventional Shack-Hartmann technique.

Thus, after achieving the objective of edge phasing the entire array of reflector segments starting at the edge of a reference reflector surface, it has been discovered that by incorporation of the conventional Shack-Hartmann technique for removing tilt from each segment surface with the technique of Nelson, et al., (Keck Observatory Report #180), a segmented array can be phased over the full aperture after adjusting for zero piston and tilt errors by finding for each segment the RMS best fit to the known geometric configuration of the telescopic mirror.

The entire method is comprised of the following steps: first obtaining a true reflector reference surface for use as a high-quality central segment in the center of a segmented primary telescope mirror having a hypothetical surface obtained by rotating a curve $f(x,y)=0, z=0$, such as a parabola to generate a paraboloid of revolution; next phasing the inside edges of a first ring of segments in the segmented telescope mirror with the reference surface using the white light edge phasing technique to align in both piston and tilt the inside edges of the first ring of segments of the segmented telescope mirror with the central reference surface; and in the third step using the edge phasing technique to align in both piston and tilt an edge of subsequent rings with an edge of an adjacent segment in a ring of segments that has been aligned using the edge phasing technique, until all segments throughout the array have been adjusted for zero piston and tilt error between edges by this edge phasing technique.

This creates a continuous surface from segment to segment from the first ring of segments edge phased using the central reference surface to the last ring of segments on the periphery of the segmented telescope mirror edge phased with segments of the proximate ring. Full surface phasing (as distinct from edge phasing) may then be achieved using the conventional Shack-Hartmann technique followed by the technique of Manhart and Rodgers for finding the RMS best fit for each segment of the mirror array.

While it is possible to provide the true reflector reference surface in the central position of a primary telescope mirror using a ring of small mirrors, one mirror for each segment in the first ring of segments of the telescope mirror, it may be preferable to provide a monolithic segment as a reflector reference surface whose radius of curvature is the nominal radius of curvature of the segmented array at the central position which may be left open in a primary telescope mirror. The reflector reference surface is configured to the hypothetical surface of the primary telescope mirror.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1b illustrates the prior-art lenslet array for a conventional Shack-Hartmann layout of FIG. 1a.

FIG. 2a illustrates in an isometric view a ring of reference mirrors positioned on a surface having a radius of curvature equal to the nominal radius of curvature of the segmented mirror of FIG. 1a.

DETAILED DESCRIPTION OF THE INVENTION

Figure 1A:
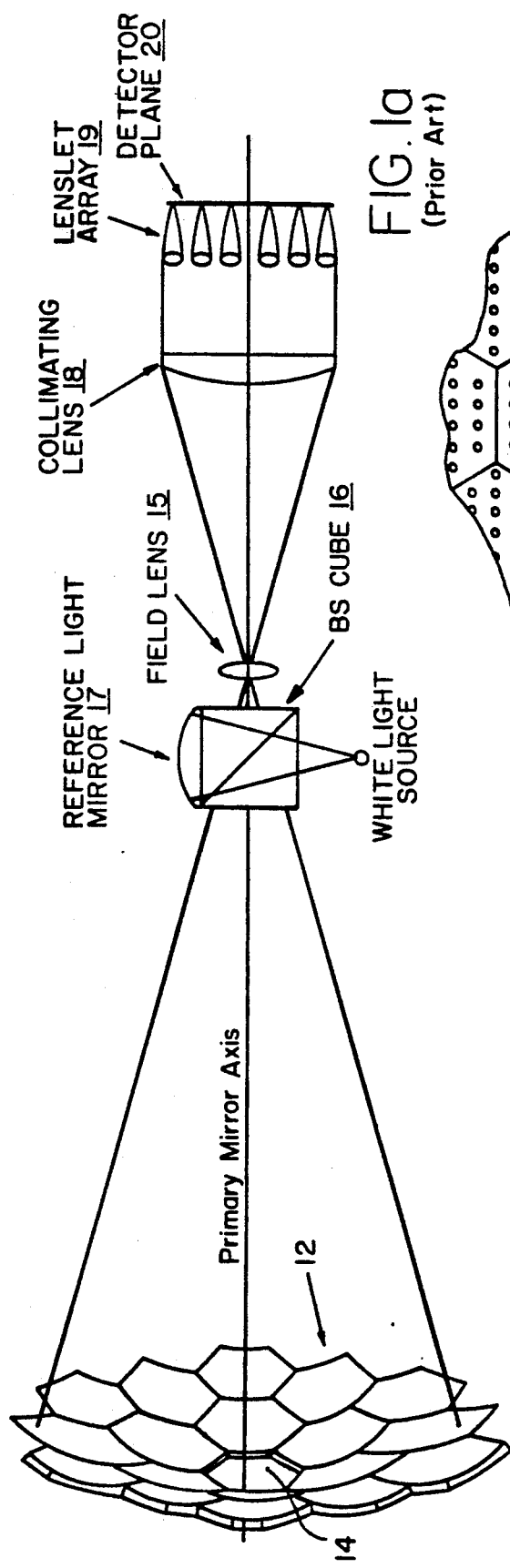
FIG. 1a illustrates schematically a conventional Shack-Hartmann camera layout for testing the surface alignment of a segmented mirror.

The method of this invention will now be described in detail with reference to the drawings. In the first step, a parabolic reflector reference surface 10 shown in FIG. 2a is provided as a single monolithic mirror, or defined as further shown in FIG. 2a using six small mirrors 1-6 arranged to lie on a ring 11 whose diameter is slightly smaller than the side to side dimension D of a segment in the segmented parabolic mirror 12 shown in FIG. 1a. The six mirrors are all selected to be identical high-quality surfaces whose radius of curvature 13 is the nominal radius of curvature for the open central position 14 of the primary parabolic mirror 12 shown in FIG. 1a.

Figure 2A:
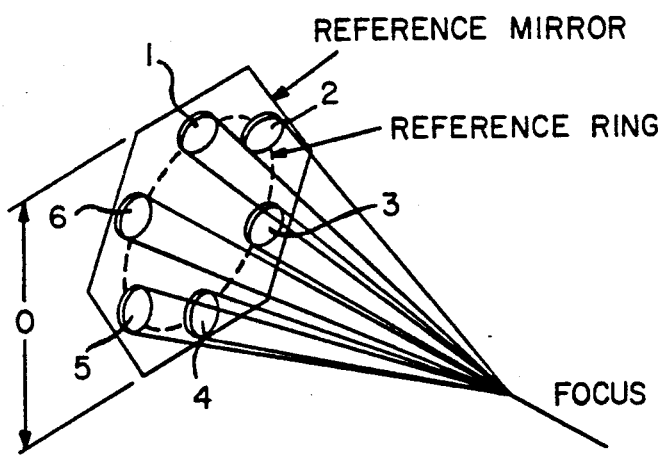
Figure 2B:
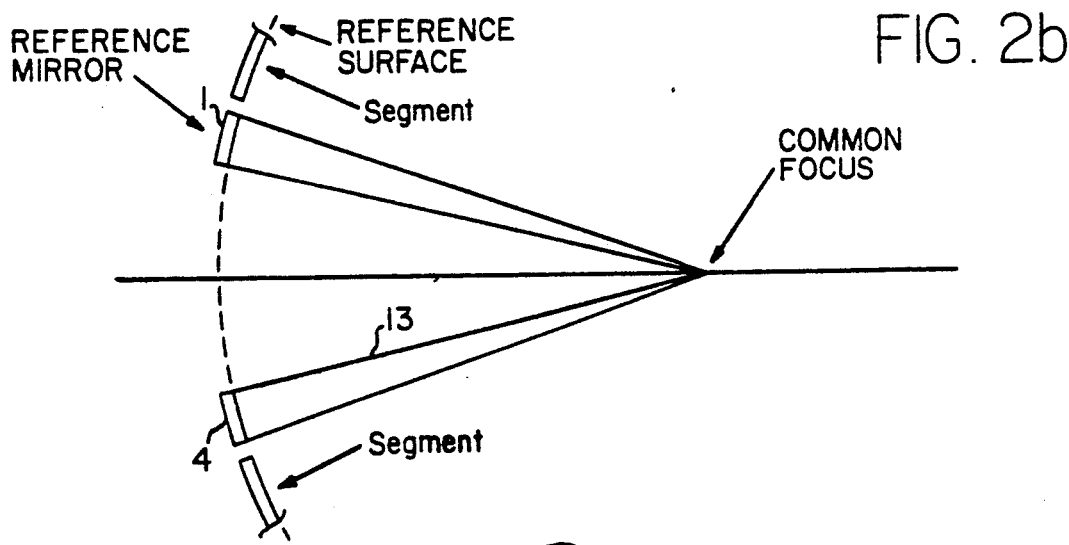
FIG. 2b illustrates a sectional view of two diametrically opposed segments of the ring of segments shown in FIG. 2a and part of adjacent segments of the primary mirror array of FIG. 1.

All of the reference mirrors 1-6 of the ring 11 are prealigned and prephased with respect to a common focus point shown in FIG. 2b, which corresponds to the position of a field lens 15 in FIG. 1a at the focus of the primary parabolic mirror 12 under test. If that mirror were spherical in shape, that common focus point might be the center of curvature. Once aligned and prephased, the ring 11 of reference mirrors 1-6 is placed in the central position 14 of the segmented mirror 12 with one reference mirror opposite a side of each of the six segments in the first ring of the segmented mirror.

Figure 1C:
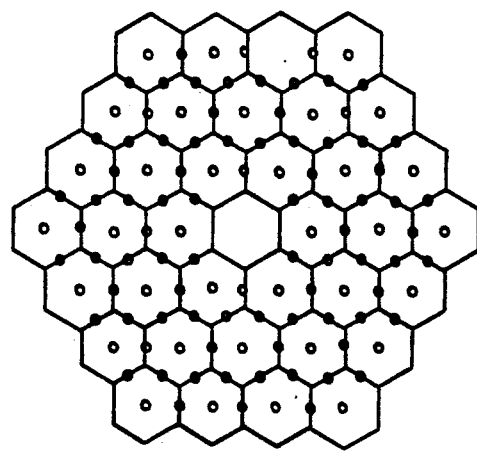
FIG. 1c illustrates a prior-art lenslet array modified for the Shack-Hartmann camera layout of FIG. 1a to detect piston errors between segments of a segmented mirror.
Figure 2C:
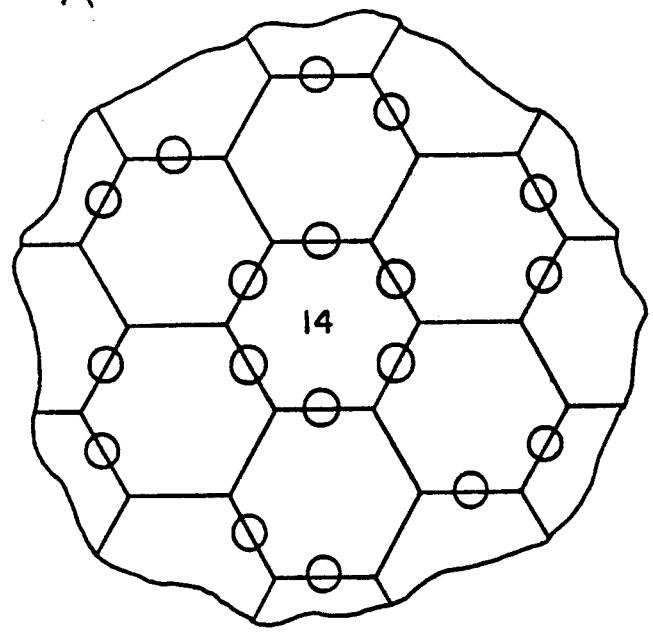
FIG. 2c illustrates an array of lenslets arranged so that a different lenslet straddles the projected inner edge of the first ring of segments around the center opening of a primary segmented mirror in which the ring of reference mirrors of FIG. 2a is placed, and a different lenslet straddles one projected edge of each segment in a subsequent ring adjacent to an edge of a segment in the inner ring of segments.

Having defined a central reference surface of six reference mirrors 1-6 positioned in the ring 11 while placed in the center position 14 of the segmented mirror 12, the inside edges of all segments in the first ring of segments are brought into phase (piston and tilt) alignment with adjacent reference mirrors 1-6. This is done using the Shack-Hartmann camera modified to have the lenslet array similar to that of FIG. 1c, with an additional set of six lenslets that straddle the inside edges of the first ring of six hexagonal segments surrounding the center position 14, and simplified by omitting the lenslet at the center of each projected hexagonal segment and omitting all but one lenslet straddling one edge between adjacent segments as projected in the detector plane and shown in FIG. 2c for the first two rings of hexagonal segments. This provides a virtually continuous surface from the reference ring 11 to the segments around the central position 14 as though the central position contained a monolithic hexagonal reflector of the nominal radius of curvature 13 with its six edges aligned with edges of the adjacent six hexagonal segments in the first ring of segments of the primary mirror.

Figures 3A, 3B, 3C:
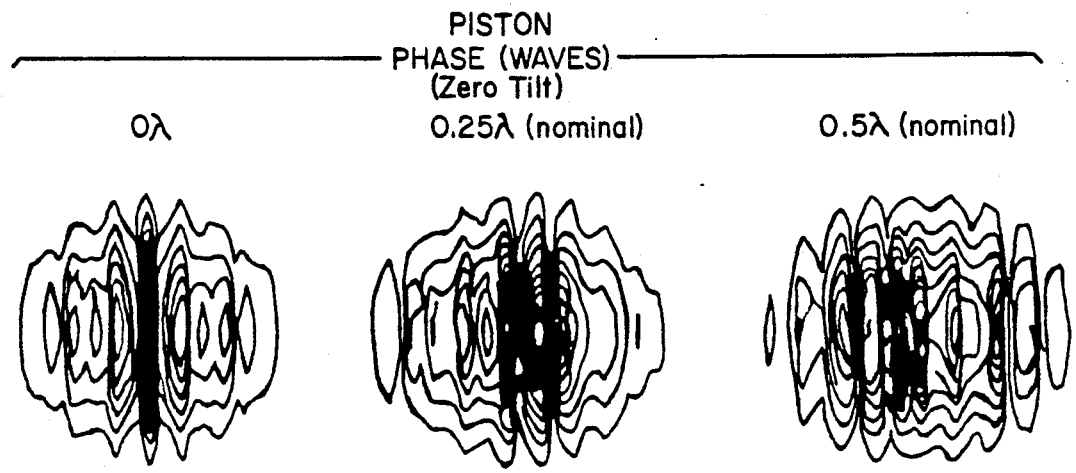
FIGS. 3a, b and c illustrate a white-light contour map of two wavefronts going through a lenslet when in phase (0 piston error), a quarter wavelength out of phase (0.25λ piston error), and a half wavelength out of phase (0.5λ piston error), respectively.
Figures 3D, 3E:
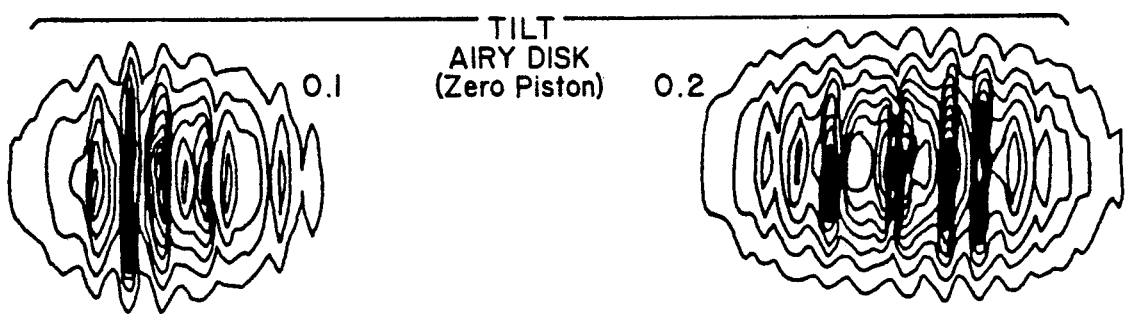
FIGS. 3d and 3e illustrate a white-light contour map of two wavefronts from adjacent segments with a relative tilt error of 0.1 and 0.2 (Airy disk), respectively.

White light from a far field source illuminating the primary mirror 12 is reflected by the first ring of segments and by the mirrors 1-6 of the reflector reference ring 11 shown in FIG. 2a when placed in the central position 14. As noted hereinbefore, the local white-light source is used only for internal calibration of the camera, so that the beam splitter (BS) 16 is provided only for introducing the locally generated white light. The six mirrors of the reference ring reflect light received from the source through the field lens 15 and a collimating lens 18 to the lenslet array 19. Each lenslet focuses light from the projected area it covers of the primary segmented mirror 12 to a detector plane 20. The detector plane 20 then detects white-light interference patterns between a wave returned by the mirrors 1 through 6 of the reference ring 11 and a wave returned by adjacent segments in the first ring of segments of the primary mirror 12. The white light contour shown in FIG. 3a indicates that the two interfering waves at one of the lenslets focusing light from one of the reference mirrors 1-6 and a portion of an adjacent hexagonal segment of the primary mirror 12 are in phase, while the contours shown in FIGS. 3b and 3c indicate that the two interfering waves are out of phase by one fourth and one half a wavelength, respectively. Signatures shown in FIGS. 3d and 3e are indicative of tilt ($\alpha$ or $\beta$) error (about the x or y axis) without any piston (z axis) error. Different signatures are obtained for other piston and tilt errors. In each case of error, the signature is not symmetrical. The zero-error symmetrical signature of FIG. 3a is achieved only when phase adjustment in piston and tilt has been made for zero piston and tilt error of the segment edges straddled by a lenslet. The segment adjacent to the one of the mirrors 1-6 associated with the lenslet at which an out-of-phase contour occurs is adjusted in tilt and piston relative to the reference ring 11 until the in-phase contour of FIG. 3a is achieved.

Once the inner edge of each segment in the first ring of segments of the segmented primary mirror 12 surrounding the central position 14 has been phase adjusted to correct piston and tilt errors with reference to the ring 11 of the mirrors 1-6, an edge of each hexagonal segment in the next ring of segments adjacent to those phase adjusted segments may be similarly edge phased to correct piston and tilt errors using the contour images from lenslets straddling the edges of those segments of the primary mirror 12 projected through the lenslet array 19.

Figure 1B:
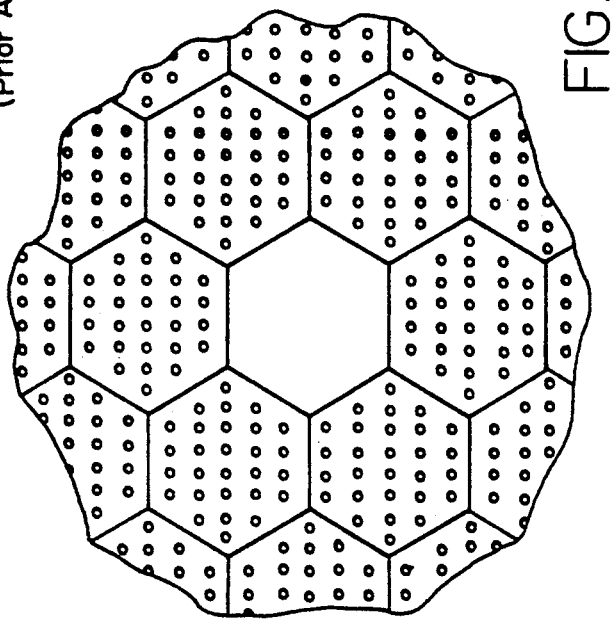

A conventional Shack-Hartmann camera layout with a lenslet array as shown in FIG. 1b is next used to measure slope variations across the full array in a conventional manner. Tilt or slope information for all segments surrounding the inner ring of segments is converted in the last step into surface height variation with respect to the inner ring whose optical path is set to height zero on a hypothetical profile of an ideal surface geometry, as will be described below. Since the conventional lenslet array of FIG. 1b is used for this subsequent step, one additional lenslet could be added to that array in a position straddling each edge of every pair of adjacent segments in addition to lenslets straddling the inner edges of the first ring of six segments surrounding the open position 14. It would then not be necessary to change lenslet arrays when this subsequent step is reached.

Figure 4:
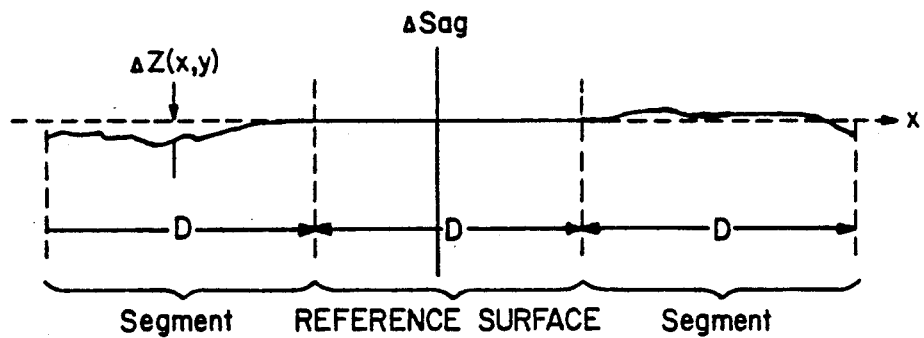
FIG. 4 is a cross section diagram of the first ring of segments in the segmented mirror shown in FIG. 1a mapping the surface height relative to the reference surface shown in FIG. 2a to define piston error ($\Delta z$) and surface height variations ($\Delta$Sag).

FIG. 4 is a hypothetical cross section profile across reference mirrors 1 and 4 and adjacent primary mirror segments with surface height (piston) errors measured along the vertical axis ($\Delta$Sag) and diameter along the horizontal axis (x). The inside reference surface defined by the reference ring of mirrors (as shown in FIG. 2b) lays on the horizontal axis because it represents zero sagitta (sag) error which may be viewed as surface height error. $\Delta$Sag is thus surface height variation of the segments with respect to the reference surface defined by the ring of reference mirrors. Once the edges of the segments are phase (piston and tilt error) adjusted with the reference ring, the surface height is continuous from the reference ring to the segments. Any variation of surface height error of other segments with respect to the first ring of segments is similarly phase and tilt corrected using the lenslet array arrangement shown in FIG. 1c. Thereafter, variation of slope is mapped out over the entire array in the subsequent step referred to above using a conventional Shack-Hartmann technique with the lenslet array illustrated in FIG. 1b. That subsequent step yields slope deviation which is converted to surface height variation by integration. Surface height error at the straddling lenslet of each pair of segments is zero and supplies the constant of integration.

Interpolation between lenslets can be done by fitting the data to a polynomial or a spline curve whose first and second derivatives are continuous at all points, or by some previously determined surface measurement. The technique used in the computer program described by Manhart and Rodgers (1988) referred to above compensates for manufacturing and alignment errors in order to minimize the surface height variation with respect to the hypothetical parabolic reference surface corresponding to the horizontal axis of FIG. 4 whose $\Delta$Sag is zero.

Figure 5:
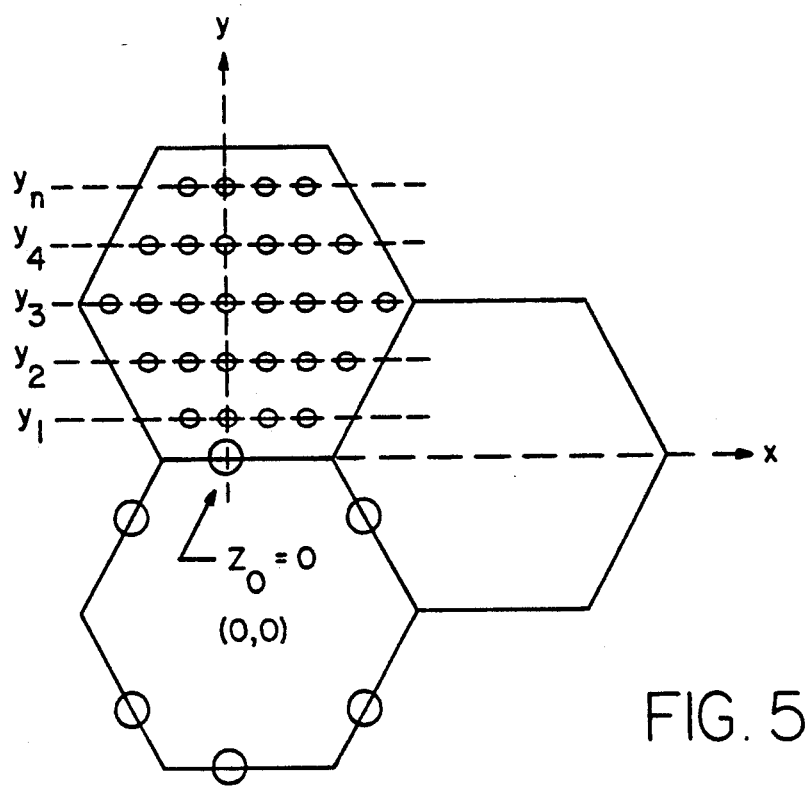
FIG. 5 illustrates Schack-Hartmann screen integration with reference to a typical segment and a conventional Shack-Hartmann lenslet projected on it after it has been subjected to edge phasing at $z_0$ (i.e., where sag-and-tilt error has been adjusted to zero with respect to the reference surface of FIG. 2b).

FIG. 5 shows a typical segment with the lenslet pattern of FIG. 1b (modified to include segment straddling lenslets) projected on it. The local origin is represented by $Z_0$, which is the point at which the sag-and-tilt error is zero with respect to the reference surface via the modified lenslet array of FIG 1c. The conventional Shack-Hartmann lenslet array of FIG. 1b modified to include one lenslet at one edge between adjacent segments then maps out slope errors over the segment surface. Fitting the alphaslope slope ($\alpha$) errors (tilt about y axis) to a spline or polynomial along the y axis where x=0 and integrating yields the corresponding surface-height values at (0,y1) (0,y2),..., (0,yn), etc. Then, fitting and integrating the beta slope ($\beta$) errors (tile about x axis) along the rows will fill in the rest of the segment with surface-height errors. This procedure is followed for each hexagonal segment until the surface height variation, or $\Delta$sag, is mapped out over the entire array.

For compensation, it is necessary to calculate what amount of piston ($\Delta z$), and tilt ($\alpha$ and $\beta$) is required to minimize $\Delta$Sag over the entire surface. This is readily accomplished if the $\Delta$Sag data is arranged in a rectangular array. Then by summing all the values in the $\Delta$Sag map and taking the average value, a good approximation is determined as to how much the segment must move in piston to bring the average $\Delta$Sag value to zero. For tilt compensation, a good approximation can be achieved by fitting a line to each row and column of data and weighting each line by the number of data points it contains. If the average slope is taken in each direction, one obtains piston ($\Delta z$) and both $\alpha$ and $\beta$ tilts that can be used as compensators. The piston and tilt adjustments are then made for each panel. After adjustments are made, the surfaces are no longer continuous, so the technique cannot be used twice in iteration.

Figure 6:
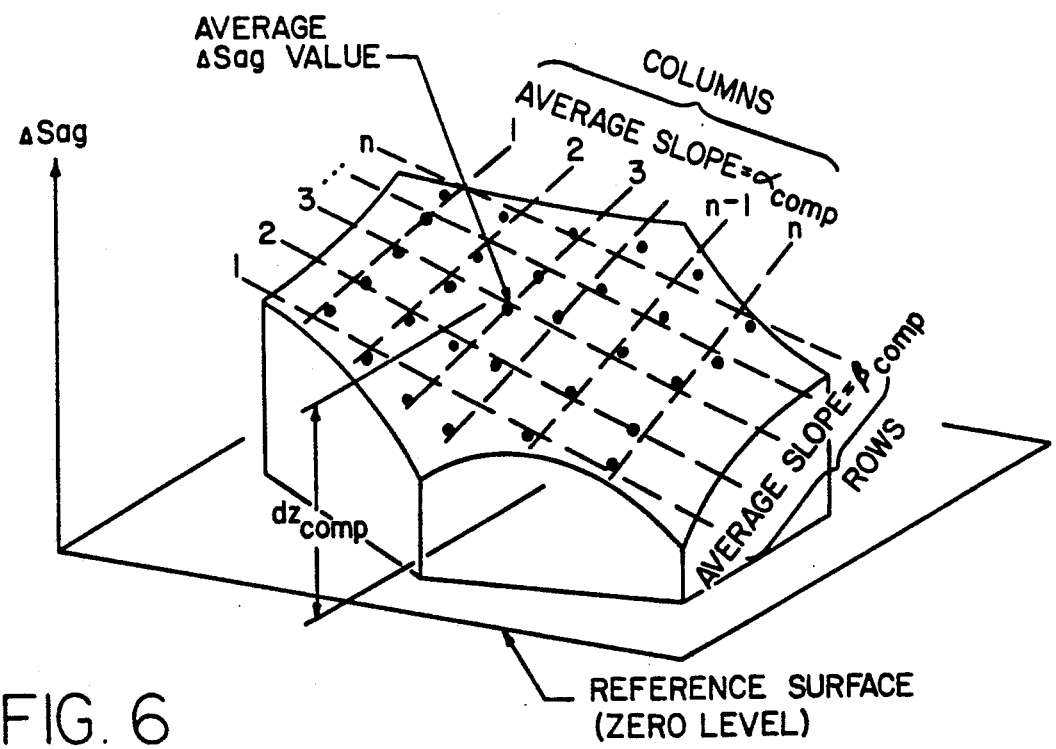
FIG. 6 is a graph of one segment surface useful in understanding focus and tilt compensation by finding the RMS best fit of each segment of a segmented mirror array after all segments have been subjected to edge phasing and Shack-Hartmann screen integration for piston and tilt error correction.

FIG. 6 illustrates this piston and tilt compensation calculation. The kind of compensation described here finds a good approximation of the position of each segment with respect to the nominal reference surface by minimizing the sag difference over the aperture. The following Equations (1) through (3) are used to calculate the three compensators.

$$(dz)_{comp} = \frac{1}{npts} \sum_{i=1}^{npts} (\Delta sag)_i \qquad (1)$$

$$\alpha_{comp} = \frac{1}{npts} \sum_{i=1}^{nclms} n_i m_i \qquad (2)$$

$$\beta_{comp} = \frac{1}{npts} \sum_{i=1}^{nrows} n_i m_i \qquad (3)$$

where $m_i$ = slope of (line)$_i$
$n_i$ = number of points in (row or column)$_i$
nrows = number of rows in data array
nclms = number of columns in data array
npts = number of data points in array Although particular embodiments of the invention have been described and illustrated herein, it is recognized that modifications and variations may readily occur to those skilled in the art. Consequently, it is intended that the claims be interpreted to cover such modifications and equivalents.

I claim:

1. A method for phase adjusting edges of an array of segments in a segmented primary telescope mirror of known geometric configuration having an open central position, and rings of segments surrounding said central position, comprising the steps of
   providing a reference surface in said central position, said reference surface conforming to said geometric configuration extended across said central position,
   edge phasing with said reference surface inside edges of a first ring of segments in said central portion to align said inside edges of said first ring of segments with said reference surface, edge phasing one edge of each segment surrounding said first ring of segments, and of subsequent rings of segments in sequence, with respect to adjacent edges of segments in an inner ring of segments, wherein each edge phasing of a segment with said reference surface and each edge phasing of a segment with adjacent segment is carried out by illuminating said segmented primary mirror and reference surface in said central position and a reference mirror simultaneously with white light from a far field source, combining reflected light from adjacent edges of segments of a first ring of segments of said primary mirror and said reference surface through a set of lenslets, one lenslet for each segment straddling the projected edge of said reference surface, and at an image detector plane, detecting white-light interference contour signatures separately from each of said set of lenslets, each lenslet being positioned to receive reflected light from an area straddling an edge of a segment, one lenslet for each edge adjacent to said reference surface, adjusting each of said segments surrounding said reference surface to a position where its interference contour signature is indicative of zero piston and tilt error with respect to said reference surface, combining reflected light from adjacent edges of segments of said first ring of segments and a second ring of segments of said primary mirror through a set of lenslets, one lenslet straddling one projected edge of each segment of said second ring of segments and a projected edge of an adjacent segment of said first ring of segments, adjusting each of said segments surrounding said first ring of segments to a position where its interference contour signature is indicative of zero piston and tilt error with respect to said reference surface, combining reflected light from adjacent edges of segments of each successive ring of segments and a next ring of segments of said primary mirror through a separate set of lenslets, one lenslet for each segment in the next ring of segments and one adjacent edge of the preceding ring of segments, and adjusting each segment of said next ring of segments to a position where its interference contour signature is indicative of zero piston and tilt error with respect to said adjacent segment of said preceding ring of segments.

2. A method as defined in claim 1 comprising the further step of full surface phasing for removing tilt errors from each segment surface using a conventional Shack-Hartmann technique after edge phasing all segments of said segmented primary telescope mirror by finding for each segment the RMS best fit to a known geometric configuration of said telescope mirror.

3. A method for adjusting all segments of a segmented primary telescope mirror to conform to a known geometric configuration desired for said telescope mirror, said geometric configuration being a surface obtained by rotating a curve f(x,y) about a z axis, where x, y and z axes are mutually perpendicular, comprising the steps of obtaining a true reflector reference surface for use as a high-quality central segment in the center of said segmented primary telescope mirror, phasing the inside edges of a first ring of said segments in said segmented telescope mirror with the reference surface using a white-light edge phasing technique to align in both piston and tilt and inside edges of said first ring of segments of said segmented telescope mirror with the central surface, and using said edge phasing technique to align in both piston and tilt an edge of subsequent rings with an edge of an adjacent segment in a ring of segments that has been aligned using said edge phasing technique, until all segments throughout the array have been adjusted for zero piston and tilt error between edges by this edge phasing technique, thereby creating a continuous surface from segment to segment from said first ring of segments edge phased using said central reference surface to the last ring of segments on the periphery of said segmented telescope mirror edge phased with segments of a proximate ring of segments.

4. A method for adjusting all segments of a segmented primary telescope mirror to conform to a known geometric configuration desired for said telescope mirror as defined in claim 3 further comprising the step of achieving full surface phasing using a conventional Shack-Hartmann technique followed by finding the RMS best fit for each segment of the mirror array.

5. Apparatus for adjusting all segments of a segmented primary telescope mirror to conform to a known geometric configuration desired for said telescope mirror, said geometric configuration being a surface obtained by rotating a curve f(x,y) about a z axis, where said x, y and z axes are mutually perpendicular, comprising a reflector reference surface whose radius of curvature is the nominal radius of curvature of said segmented array at the central position which may be left open in a primary telescope mirror, said reflector reference surface being configured to the hypothetical surface of said primary telescope mirror, means for edge phasing each segment in a first ring of segments by adjusting piston and tilt error to be zero at the edge of each segment with respect to said reference surface, and means for edge phasing each segment in each subsequent ring of segments by adjusting piston and tilt error to be zero at one edge of each segment with respect to an adjacent edge of a segment in a preceding ring of segments as edge phase proceeds from ring to ring of segments in said segmented telescope mirror.

6. Apparatus as defined in claim 5 wherein said reference surface is comprised of a plurality of mirrors, one placed adjacent to each segment in said first ring of segments, said mirrors having a configuration and position conforming to said geometric configuration of said primary mirror at the center thereof about said z axis.

* * * * *